United States Patent
Vallinen et al.

(10) Patent No.: US 7,065,339 B2
(45) Date of Patent: Jun. 20, 2006

(54) METHOD AND SYSTEM ENABLING PREPAID SERVICE IN AN ALL-IP NETWORK

(75) Inventors: Juha Vallinen, Tampere (FI); Juha-Pekka Koskinen, Hameenlinna (FI)

(73) Assignee: Nokia Corporation, Espoo (FI)

( * ) Notice: Subject to any disclaimer, the term of this patent is extended or adjusted under 35 U.S.C. 154(b) by 86 days.

(21) Appl. No.: 10/451,236

(22) PCT Filed: Dec. 22, 2000

(86) PCT No.: PCT/EP00/13248

§ 371 (c)(1),
(2), (4) Date: Oct. 10, 2003

(87) PCT Pub. No.: WO02/052834

PCT Pub. Date: Jul. 4, 2002

(65) Prior Publication Data

US 2004/0058671 A1    Mar. 25, 2004

(51) Int. Cl.
*H04M 11/00* (2006.01)
*H04M 17/00* (2006.01)
*H04Q 7/20* (2006.01)
*H04Q 7/00* (2006.01)

(52) U.S. Cl. .................. 455/406; 455/433; 379/114.2; 379/242; 379/392; 370/328

(58) Field of Classification Search ............... 455/406, 455/433, 408, 405; 379/114.2, 242, 144.01, 379/211.02, 127.05, 207.02, 114.28; 370/392, 370/328, 352, 127

See application file for complete search history.

(56) References Cited

U.S. PATENT DOCUMENTS

| | | | | |
|---|---|---|---|---|
| 5,737,414 A | * | 4/1998 | Walker et al. | 705/40 |
| 5,745,556 A | * | 4/1998 | Ronen | 379/127.05 |
| 5,854,975 A | * | 12/1998 | Fougnies et al. | 455/408 |
| 5,905,736 A |   | 5/1999 | Ronen et al. | 370/546 |
| 6,058,300 A | * | 5/2000 | Hanson | 455/406 |
| 6,236,851 B1 | * | 5/2001 | Fougnies et al. | 455/408 |
| 6,373,930 B1 | * | 4/2002 | McConnell et al. | 379/114.28 |
| 6,404,870 B1 | * | 6/2002 | Kia et al. | 379/144.01 |
| 6,434,379 B1 | * | 8/2002 | Despres et al. | 455/406 |
| 6,453,029 B1 | * | 9/2002 | Campbell | 379/114.2 |
| 6,480,597 B1 | * | 11/2002 | Kult et al. | 379/242 |
| 6,535,727 B1 | * | 3/2003 | Abbasi et al. | 455/406 |
| 6,546,247 B1 | * | 4/2003 | Foti et al. | 455/433 |

(Continued)

FOREIGN PATENT DOCUMENTS

EP    0 921 487 A2    12/1998

(Continued)

*Primary Examiner*—William Trost
*Assistant Examiner*—Kiet Doan
(74) *Attorney, Agent, or Firm*—Squire, Sanders & Dempsey LLP

(57) ABSTRACT

The invention relates to a system and method for enabling prepaid service in a packet-based communications system, in particular in an All-IP network which comprises one or more subscriber terminals. At least one subscriber database stores subscriber information including identification data of one or more server means, and the at least one server means stores prepaid accounts for subscribers. When a subscriber terminal is initiating the establishment of a connection to another network entity, the server means is adapted to transmit a subscriber-prepaid-account related value informing a control means on an available charge threshold value for the connection to be established.

16 Claims, 2 Drawing Sheets

U.S. PATENT DOCUMENTS

| | | | |
|---|---|---|---|
| 6,570,973 B1 * | 5/2003 | Boughman et al. | 379/207.02 |
| 6,584,097 B1 * | 6/2003 | Malik | 370/352 |
| 6,654,606 B1 * | 11/2003 | Foti et al. | 370/392 |
| 6,694,003 B1 * | 2/2004 | Karam | 379/211.02 |
| 6,704,303 B1 * | 3/2004 | Bowman-Amuah | 370/352 |
| 6,704,563 B1 * | 3/2004 | Senn et al. | 455/406 |
| 6,751,204 B1 * | 6/2004 | Foti et al. | 370/328 |
| 6,785,372 B1 * | 8/2004 | Moss et al. | 379/114.2 |

FOREIGN PATENT DOCUMENTS

| | | |
|---|---|---|
| WO | 00/02374 | 1/2000 |
| WO | 00/24161 | 4/2000 |

* cited by examiner

METHOD AND SYSTEM ENABLING PREPAID SERVICE IN AN ALL-IP NETWORK

FIELD AND BACKGROUND OF THE INVENTION

The invention relates to a method and system enabling PrePaid service in an All-IP network.

Customary networks provide proper charging of calls in a standardized manner. In recent years, prepaid solutions are offered in which subscribers are paying money in advance to an account from which call charges or other types of telecommunication charges of the respective subscriber are subsequently deducted. The account is usually stored in a prepaid telephone card or in an IN (Intelligent Network) system in the telecommunications network.

However, in an All-IP network in which the call originating and terminating equipments as well as any intermediate network elements are addressed using their IP addresses, no Prepaid service is presently implemented because of technical difficulties.

SUMMARY OF THE INVENTION

The present invention provides a method an/or system.

In particular, the invention provides a method and system for enabling prepaid service in a packet-based communications system which comprises one or more subscriber terminals, at least one subscriber database storing subscriber information, and at least one server means storing prepaid accounts for subscribers, the subscriber information stored in the subscriber database for the subscriber(s) including the identification data, for example name and/or address of the server means, wherein, when a subscriber terminal is initiating the establishment of a connection to another network entity, the server means is accessed and returns a subscriber-prepaid-account related value informing on an available charge threshold value for the connection to be established.

According to the present invention, the PrePaid problem is solved by providing an additional network node, in the following also called PrePaid Server (PPS) which preferably is a network-external server.

The PrePaid Server PPS serves for implementing prepaid services in All-IP networks. The PrePaid server (PPS) takes care of on-line subscriber billing per call basis. PPS may be provided by a bank or other financial institution. The subscriber(s) will make a contract with PPS provider. The contract is made known to the subscriber's operator and identification data, for example, address and/or name of the PPS is stored to subscriber's profile in a subscriber database such as Home Subscriber Server (HSS).

Authentication may be performed in CPS/HSS (Call Processing Server/Home Subscriber Server). The authorization may be made a prerequisite for usage of PPS. For each subscriber there is defined, in his/her stored profile, the PPS to be used.

As the proper handling and implementing of prepaid service is becoming more and more complicated due to fragmented networks, the prepaid servers may form part of one or more networks so that a new network architecture is provided. The use of the PrePaid Server in the network(s) is approximately defined.

Subscriber(s) can have one or more prepaid servers PPS in use. These servers "hide" whatsoever applications are used in transactions and enable a reasonable way to implement prepaid service. Server(s) also enable(s) on-line charging towards different applications.

DETAILED DESCRIPTION OF PREFERRED EMBODIMENTS OF THE INVENTION

Figure 1:
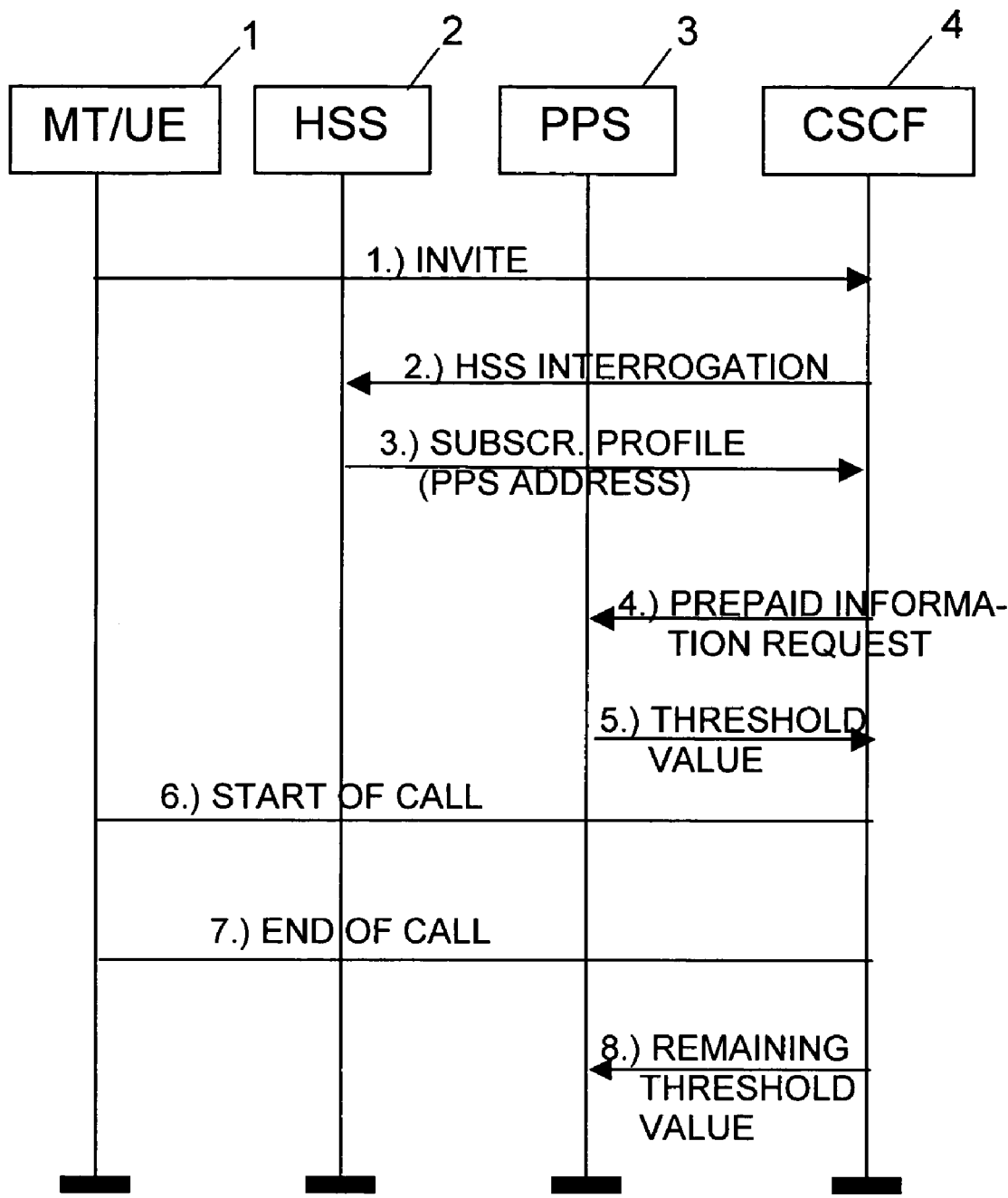
FIG. 1 illustrates a first embodiment of the present invention.

FIG. 1 illustrates a first embodiment which may be considered as a basic case, comprising a PPS 3 and making usage of PPS 3 in a Core network without using SCE (Service Creation Environment). As shown in FIG. 1, a mobile terminal or user equipment (MT/UE) 1 can communicate with one or more Call State Control Functions (CSCF) 4. A subscriber database such as HSS 2 stores basic subscriber information including identification data, for example name(s) or address(es), preferably IP addresses, of one or more PPS server(s) 3 assigned to the subscriber or MT/UE 1 (Mobile Terminal/User Equipment).

For initiating a call or connection of other type, MT/US 1 may perform a normal SIP INVITE operation to the CSCF (Call State Control Function) 4 by sending INVITE message 1.). The INVITE operation is part of SIO (Session Initiation Protocol), a signalling protocol for IP based communications, which is defined by IETF. CSCF 4 loads the subscriber profile from the HSS (Home Subscriber Server) 2 by performing a HSS interrogation 2.). The HSS 2 returns message 3.), that is, the subscriber profile data including PPS info, for example, PPS address. In a next step 4.), the CSCF 4 addresses PPS 3 and requests Prepaid information for the subscriber 1 initiating the session. The PPS 3 returns a message 5.) indicating the actual threshold value (actually the remaining prepaid amount still to be used) of the subscriber in question. Thereupon, the session, for example the call is started, step 6.), provided that the threshold value is sufficient for initiating the session. When the call ends as indicated by 7.), CSCF 4 calculates the session charges and deducts these from the threshold value received in step 5.). The remaining threshold value is returned (message 8.) to PPS 3 as now valid threshold value. PPS 3 decreases subscribers account correspondingly and transfers the used amount of money to operators account.

Figure 2:
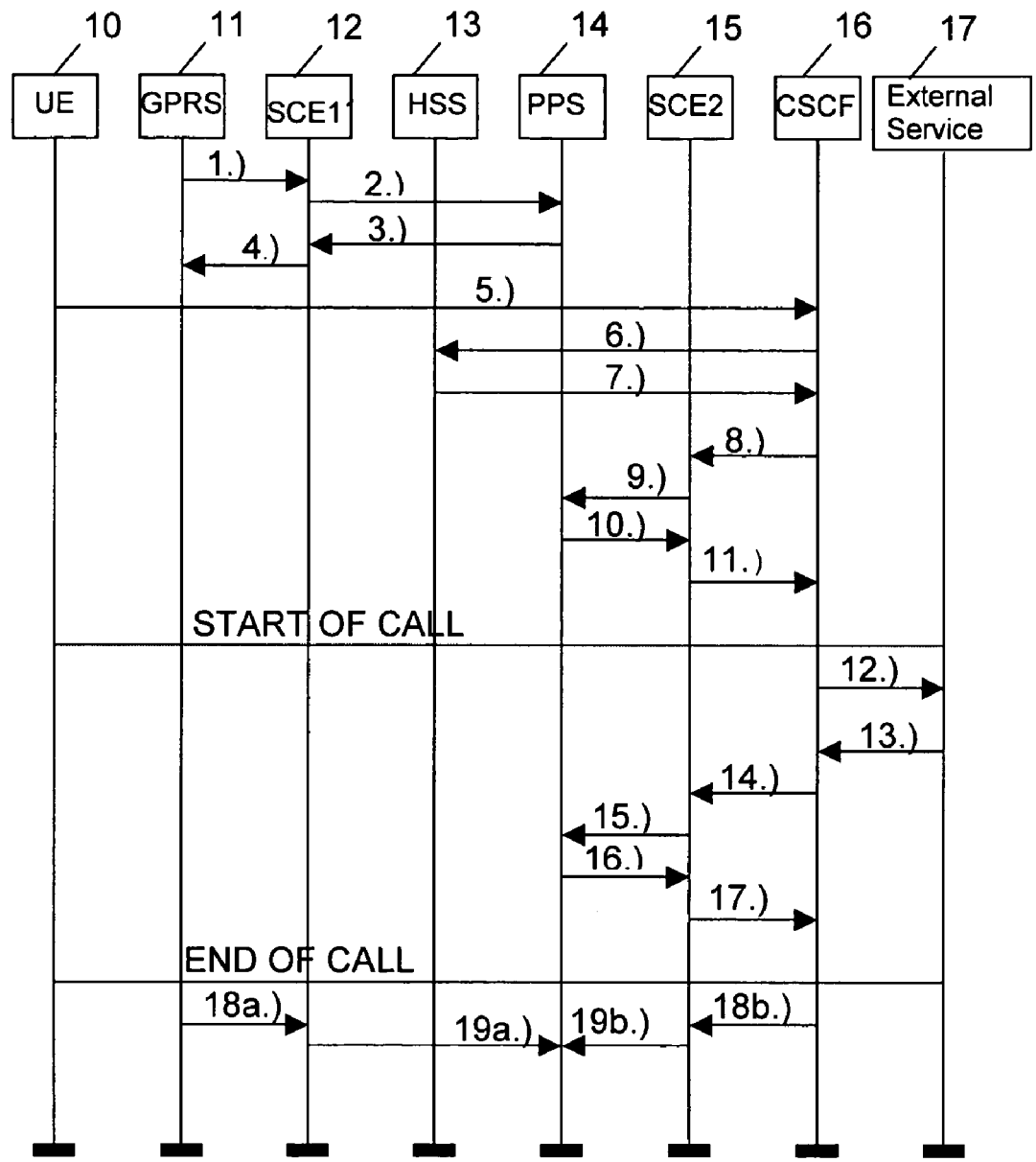
FIG. 2 shows a second embodiment of the present invention.

FIG. 2 illustrates a further embodiment wherein PPS is used with SCE (Service Creation Environment). The access and core networks are separated, and an external service is used.

The steps performed according to FIG. 2 are explained below with reference to the step numbers attached to the information flows shown in FIG. 2.

1.) A GPRS access network 11 sends a (e.g. SGSN, Serving GPRS Support Node, of the GPRS network) trigger message to a first Service Creation Environment element (SCE1) 12. The trigger message sent in step 1.) includes the identification data, for example the IP address, of PPS 14, a CIE (Charging Information Element) element as well as an identify of the access network.

It should be noted that while GPRS terminal UE (User Equipment) 10 has made the GPRS attach request or update before performing step 1.), the profile of subscriber (including name and/or address, e.g. IP address, of PPS 14) has been downloaded to SGSN from HSS 13. So the PPS 14 identity is already known in this phase. Call related global charging_ID is included in the CIE (Charging Information Element) element as well as identity of the access network.

2.) SCE1 12 requests prepaid information from PPS 14 and delivers CIE to PPS 14. Global Charging _ID id linked to subscriber temporary "virtual" account in PPS 14. Access network identity is stored into PPS 14 for billing purposes.

PPS decreases the subscribers account with a suitable share, calculates a resulting threshold value and returns this threshold value to SCE1 12. This share can be counted or calculated from parameters included in the CIE element (for example, a basic GPRS access fee) for example so that the threshold value will be enough for example, for five minutes of connection. Alternatively, the PPS 14 may simply return the presently stored actual amount of the prepaid account to the SCE1 12.

4.) SCE1 12 returns the received threshold value to the GPRS 11. It is up to GPRS 11 to request a further threshold value or clear the connection if the threshold value is used up.

Note that SCE1 12 may offer value added services in GPRS level. If this is so it has to charge these value added services separately by sending or adding a one-time charge request towards PPS 14 or requesting a charge of combined fee (using CIE in both cases). It should also be noted that the SCE1 12 (as well an additional second Service Creation Environment SCE2 15) may also be used for internal services only. If those services are not used the connection could be made straight from GPRS network (for example SGSN) 11 to PPS 14.

5.) The UE 10 sends a message, for example an INVITE message, to the CSCF 16 (including Global Charging_ID).

6.) The CSCF 16 performs an HSS 13 interrogation.

7.) The HSS 13 returns subscriber's profile data (including PPS information) to the CSCF 16.

8.) CSCF 16 triggers a message to SCE2 15, and transfers the Global Charging_ID to SCE2.

9.) SCE2 15 requests prepaid information from PPS 14. CIE is delivered to PPS 14 (basic tariffing is made in the SCE2 or in CPS, Call Processing Server). Global Charging_ID is linked to a subscriber temporary "virtual" account, and Core network identity is stored for billing purposes.

10.) PPS 14 decreases the subscribers account with suitable share and calculates or gives the threshold value. This share may be counted from parameters included to CIE element (for example basic core network fee) for example so that the threshold value will be enough for for example five minutes of connection. Alternatively, the PPS 14 may simply return the presently stored actual amount of the prepaid account to the SCE2 15.

11.) SCE2 15 returns the value to the CSCF 16. In CSCF 16, the threshold value is decreased according to charging parameters. If tariffing is done in the SCE2 15, the CIE element is returned with the remaining threshold value.

It should be noted that, similar to the explanations regarding SCE1 and step 4.), SCE2 15 may offer value added services in core network level. If it is so it has to charge these services separately by adding a one-time charge request towards PPS 14 or charging a combined fee (using CIE in both cases). It should also be noted that the SCE2 (as well as SCE1) may be used only for internal services. If those services are not used the connection could be made from CSCF 16 straight to PPS 14.

Thereafter, the call/connection is started, as indicated by the horizontal solid line.

The CSCF 16 takes care of threshold value decreasing in core network level and SGSN in the GPRS network level. If more credit is needed, it has to be requested from PPS 14 according to steps 1–4 in core network and/or steps 8–11 in GPRS network.

12.) External service 17 is requested. It should be noted that the external service may also be a PSTN network, an ISP (Internet Service Provider) or any other service located outside of the core network. This request will include Global Charging_ID.

13.) External service 17 returns CIE element with charging parameters (fee of the service etc.) and identification of the server.

14.) CSCF 16 requests a new threshold value for the service from SCE2 15, and includes CIE with above mentioned parameters in this request 15.) SCE2 15 requests a new threshold value from PPS 14. The CIE with above mentioned parameters is included in the request PPS 14 stores the identify of the service. A check as to whether or not the subscriber is allowed to use identified service may be performed in the SCE2 15 or In the PPS 14.

16.) A new threshold value is returned from PPS 14 to SCE2 15.

17.) SCE2 15 returns the new threshold to CSCF 16.

When the call/connection is to be terminated, the call/connection is cleared ("End of call").

18a., 18b.) The remaining threshold value is returned to the SCE1 12 and SCE2 15.

19a., 19b.) The remaining threshold value is returned to the PPS 14. PPS 14 increases the subscribers account with these values. PPS 14 transfers the fees of the usages of the access network, core network and external service to corresponding accounts.

The PPS 3, 14 thus contains, or has access to, a database of the allowed services (address/name/identity) per PPS, subscriber, and maybe per subscriber account. Towards these services PPS is preferably able to transfer money from the subscribers account, for example alter having received respective charging information from the CSCF 4, 16.

The HSS 2, 13 has the identification data, for example address and/or name of the subscribers' PPS in the subscribers' profile.

The CSCF 4, 16 can count the price of each service separately according to received CIEs. It also takes care of producing CDRs (Charging Data Records) from the call. If pure prepaid is used, the CDRs are stored just for checking/legal purposes. If shared charging occurs, the CSCF settles or calculates the charges and informs SCE(s) (PPS) accordingly.

The SCE 12 and/or 15 can be adapted to include basic tariff information. It is preferably to offer different services which affect charging parameters.

With the provision of PPS, it is possible to introduce on-line prepaid charging and also AoC (Advise of Charge) to terminal. It is also possible that subscriber can have on-line account checking from PPS. This feature leaves network operating to network operator and releases it from financing. Postpaid billing scenario is not necessary and no longer needed.

The PPS server is not necessarily an operator node. For instance, if some or all teleoperators prefer to be prepaid and thus do not have to act as a bank, subscribers will possibly make a kind of direct charging agreement with the operator that is part of subscriber information. The PPS may then preferably be adapted to take care of charging, checking the used services and taking care of account balance. This sewer can be for example a bank server, which distributes the money between access and core operators and different service providers. In an All-IP network, a huge number of different service providers can exist. The subscriber will advantageously not have to pay several different small accounts but only have to pay on one PPS controlled number.

Although the invention has been described above with reference to specific embodiments, the invention intends to cover other embodiments as well which represent combinations of the above features, omissions, amendments, alternatives etc.

The invention claimed is:

1. A method for enabling prepaid service in a communications system which comprises one or more subscriber terminals, at least one subscriber database means storing subscriber information, and at least one control means for controlling a connection from a subscriber terminal to another network entity,
wherein the communications system further comprises at least one server means storing prepaid accounts for subscribers,
wherein the subscriber information stored in the subscriber database means for the subscribers include identification data of the server means storing the prepaid accounts,
said method comprising the steps of:
when a subscriber terminal is initiating the establishment of a connection to another network entity, or is attaching or updating its attachment to a network, sending a request to the subscriber database means;
the subscriber database means in response to said request transmitting, to the control means, a name and/or address of the at least one server means storing the prepaid accounts; and
when a subscriber terminal is initiating the establishment of a connection to another network entity, sending a request to the at least one server means storing the prepaid accounts; and
the server means storing the prepaid accounts transmitting to the control means, in response to said request sent to the server means, a subscriber-prepaid account related value informing on an available charge threshold value for the connection to be established,
wherein the control means is a Call State Control Function and the subscriber database means is a Home Subscriber Server.

2. The method according to claim 1, wherein the control means receives a charge threshold value from the server means when establishing a connection from the subscriber terminal, the control means deducting an actual charge of the connection from the threshold value and returning a remaining charge value to the server means after termination of the connection.

3. The method according to claim 1, wherein, when a subscriber terminal is initiating the establishment of a connection to another network entity, the subscriber database means is accessed for reading out the identification data of the server means which identification data are subsequently transmitted to the control means, the control means sending the request to the server means identified by the identification data.

4. The method according to claim 1, wherein the network is an All-IP network.

5. The method according to claim 1, wherein at least one Service Creation Environment element is provided for communicating with the server means.

6. The method according to claim 5, wherein the SCE element is informing the server means on the charges of a used service.

7. A system for enabling prepaid service in a communications system which includes one or more subscriber terminals, at least one subscriber database means storing subscriber information, at least one server means storing prepaid accounts for subscribers, and at least one control means for controlling a connection from a subscriber terminal to another network entity, the subscriber information stored in the subscriber database means for the subscribers including identification data of the server means, said system comprising:
means for, when a subscriber terminal is initiating the establishment of a connection to another network entity, or is attaching or updating its attachment to a network, sending a request to the subscriber database means which in response thereto transmits, to the control means, a name and/or address of the at least one servers means; and
means for, when a subscriber terminal is initiating the establishment of a connection to another network entity, causing the at least one server means to transmit, in response to a request sent to the server means, a subscriber prepaid account related value to the control means informing the control means on an available charge threshold value for the connection to be established,
wherein the control means is a Call State Control Function and the subscriber database means is a Home Subscriber Server.

8. The system according to claim 7, wherein the server means is adapted to send a charge threshold value to the control means when being adapted to deduct the actual charge of the connection from the threshold value and to return a remaining charge value to the server means after termination of the connection.

9. The system according to claim 7, wherein the subscriber database means is adapted to transmit the identification data of the server means to the control means when a subscriber terminal is initiating the establishment of a connection to another network entity, the control means being adapted to send the request to the server means identified by the identification data.

10. The system according to claim 7, wherein the network is an All-IP network.

11. The system according to claim 7, wherein at least one Service Creation Environment (SCE) element is provided for communicating with the server means.

12. The system according to claim 11, wherein the SCE element is adapted to inform the server means on the charges of a used service.

13. The network element for use in a method according to claim 1, wherein the network element further comprises:
a subscriber database means storing subscriber information for one or more subscribers, the subscriber information stored in the subscriber database means including identification data of at least one server means storing prepaid accounts for subscribers.

14. The network element for use in an All-IP network, for use in a method according to claim 1, wherein the network element is a server means storing prepaid accounts for subscribers.

15. The network element for use in a system according to claim 7, wherein the network element further comprises:
a subscriber database means storing subscriber information for one or more subscribers, the subscriber information stored in the subscriber database means including identification data of at least one server means storing prepaid accounts for subscribers.

16. The network element for use in an ALL-IP network, in particular for use in a system according to claim 7, wherein the network element being a server means storing prepaid accounts for subscribers.

* * * * *